July 31, 1956

CARL-ERIK GRANQVIST 2,757,367

ARRANGEMENT FOR AUTOMATIC VOLUME CONTROL
IN RECEIVERS FOR RADIO DIRECTION FINDING

Filed April 10, 1952

INVENTOR
CARL-ERIK GRANQVIST,

BY Robert B. ~~~~~

ATTORNEY

July 31, 1956

CARL-ERIK GRANQVIST
ARRANGEMENT FOR AUTOMATIC VOLUME CONTROL
IN RECEIVERS FOR RADIO DIRECTION FINDING 2,757,367

Filed April 10, 1952

INVENTOR
CARL-ERIK GRANQVIST,

BY Robert B. Pierson

ATTORNEY

United States Patent Office 2,757,367
Patented July 31, 1956

2,757,367
ARRANGEMENT FOR AUTOMATIC VOLUME CONTROL IN RECEIVERS FOR RADIO DIRECTION FINDING

Carl-Erik Granqvist, Lidingo, Sweden, assignor to Svenska Aktiebolaget Gasaccumulator, Lidingo (near Stockholm), Sweden, a corporation of Sweden Application April 10, 1952, Serial No. 281,565

Claims priority, application Sweden April 10, 1951

17 Claims. (Cl. 343—118)

In radio direction finding at high frequencies very often strong reflectional signals are obtained from objects in the vicinity of the direction finding receiver. These reflectional signals may be so strong that even if an antenna system for the reception has a very high dissolution property, it will nevertheless be impossible to distinguish the direction of the direct input wave from its reflectional signals. Tests made have proved that the disturbances from such reflectional signals may in some cases cause a bearing error of up to 90°.

It has been proposed to improve the reception of radio direction finding signals for high frequencies by providing an antenna system with a very high dissolution property, said antenna system being of such a kind that it has a strong direction action. This antenna system is rotated, and the pulses caught by the antenna system are impressed on the deviation coils of a cathode ray tube, after they have been amplified in a receiver. The deviation coils should rotate mechanically and synchronously with the antenna system, thereby creating a polar coordinate system. Alternatively a Cartesian coordinate system may be used, thereby impressing a sawtooth formed voltage in synchronism with the rotation on a second pair of deviation coils. In any case one will thereby obtain on the screen of the cathode ray tube a picture which will reproduce the direction diagram of the antenna, said diagram in this case usually consisting in a cigar shaped figure. This figure will be directed in a direction on the screen of the cathode ray tube, which distinctly determines the input signal direction, if no disturbing reflectional signals are present.

On the other hand, if reflectional signals are present, one will obtain similar figures in the directions of all of the different reflectional signals. The reflectional signals as a rule being of substantially less signal intensity than the input wave, usually no difficulties will exist in distinguishing the direction of the input signal from the input directions of the reflectional signals. This will, however, be the case only if the direction finding place is of such a kind that the intensity of the reflectional signals is really less than that of the input wave. Practical tests have proved that an antenna system of a high dissolution property, such as that mentioned above, will give an error which is less than 1° to 2°, provided that the direction finding places are of mean quality.

A direction finding receiver of the above mentioned kind is, however, as a rule provided with automatic volume control. One of the difficulties in constructing the direction finding receiver with a strong directional antenna system is just the provision of the automatic amplification control. It is already known that for providing an automatic amplification control in directed antenna systems a separate non-directional auxiliary antenna should be used, preferably with circular reception characteristic, the input field intensity of which determines the amplification control. Experiences with direction finding systems according to the present invention have, however, proved that one cannot have the auxiliary antenna and the directional antenna connected simultaneously to the receiver, because the phase position between the voltages may vary. One reason for this is that as a rule it is not possible to place both of the antenna systems in exactly the same point and to give them exactly the same geometrical extension. Due to this the antenna systems will be hit by waves which have been reflected in slightly different ways and which will continuously be in different positions of phase. Since the direction finding takes place by means of high frequencies or short wave-lengths, even a rather small difference in the propagation way of the wave frontier may cause a substantial phase displacement.

It is also difficult, purely from the point of view of construction, to keep the phase displacement in the conduits from both of the antenna systems of the receiver alike. Further, the phase displacement in the conduits must even not be allowed to vary during the tuning of the receiver over all of the frequency range in question. In order to fulfil all these demands one has, as a rule, had to connect resistors in the conduits for phase correction, but the consequence of this has been losses in the relation between signal and ground noise. This is not desirable.

It is important that the phase positions be such that the two signals do not interfere with each other. Otherwise one would get an addition or a subtraction of the reception of the antenna system, resulting in curious and non-interpretable pictures on the cathode ray tube which will vary from one direction to another. In practice, it is not possible to predict the direction of the input signal with sufficient sharpness, if the picture of the characteristic on the cathode ray tube is not symmetrical, if it is not rather narrow, and, finally, if it is not of a known configuration. During the time when the directional antenna is receiving a signal, the automatic amplification control must therefore not be variable, because the figure obtained on the cathode ray tube would then usually be non-symmetrical, and this will cause difficulties or even make it impossible to determine a line of symmetry which would indicate the direction of the input wave.

The present invention refers to an arrangement, by which these disadvantages are done away with. The invention is further described in the following with reference to the attached drawings, in which.

Figure 1:
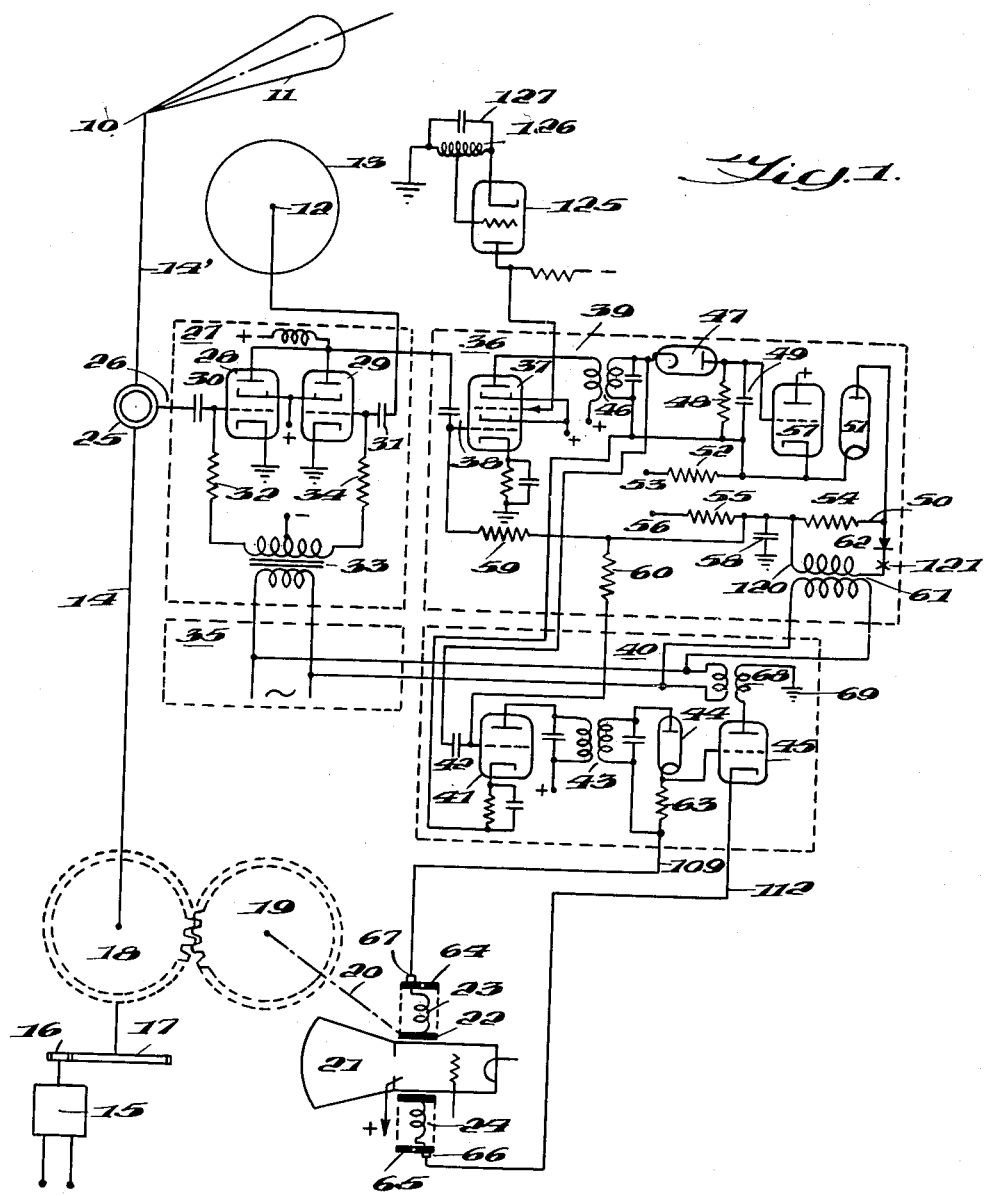
Fig. 1 shows a wiring diagram for a system according to the invention.

In the arrangement according to Fig. 1 a directional antenna system of some suitable kind is placed in point 10. Schematically, this antenna system has been indicated by curve 11, which indicates the directional characteristic of the antenna system. Correspondingly the non-directional antenna system, which is placed in point 12, is indicated by its characteristic 13.

The antenna system 10 is rotated by means of a shaft 14, driven by the motor 15 over the cog-wheel gearing 16—17. On the shaft 14 there is further a second cog-wheel 18, driving the cog-wheel 19 in synchronism with the rotation of shaft 14. The cog-wheel 19, in turn, drives a shaft 20, which is connected with a ring 22, provided around the cathode ray tube 21, carrying the magnetic deviation coils 23 and 24 of the cathode ray tube.

The feeder line from antenna 10 is carried in the interior of the upper part 14' of the shaft 14, and to be fed to the conduit 26 by means of contact rings 25. The conduit 26 running to a switching device 27, which forms one of the objects of the present invention.

The changing device 27 contains two electronic tubes 28 and 29, respectively, which are supposed to be of screen grid type. The electronic tube 28 is fed over condenser 30 by the voltage from the directional antenna system 10, and the electronic tube 29 is fed over condenser 31 with the voltage from the non-directional antenna system 12. The grid circuit of the electronic tube 28 is connected through a resistor 32 to one terminal of the secondary coil of a transformer 33, the other terminal of which being connected through resistor 34 with the grid in the electronic tube 29. The mid-point of the secondary coil is connected with negative voltage for providing the normal grid bias voltage.

The primary winding of the transformer 33 is fed with alternating current from a device 35, provided to create such alternating current. This alternating current is used for controlling the action of the automatic amplification control and is indicated in the following as control voltage.

In the parts hitherto described, the arrangement functions in such a way that both of the antenna systems 10 and 12 receive the signal, the antenna system 10, however, with a strongly limited direction characteristic, as indicated in the drawing by the indication 11. Normally the voltage from the antenna system 10 should be amplified by the tube 28, and the signal voltage from the antenna system 12 should be amplified by the tube 29, if the transformer 33 had not been provided. Because this transformer is fed with alternating current, there will be created a negative half cycle in one half of the secondary winding, a positive half cycle simultaneously occurring in the other half of said winding. The negative voltage, which is connected to the mid-point tap on the secondary winding of the transformer 33, is such that both of the tubes 28 and 29 are maintained cut off or possibly very weakly active, whereas they will not get full and normal function until a positive half cycle occurs in the associated half of the secondary winding of the transformer 33. Consequently, in one voltage direction in the secondary winding of this transformer, the electronic tube 28 will function simultaneously with the electronic tube 29 cut off, and with the other direction of the alternating voltage in this secondary winding the electronic tube 29 will function, the electronic tube 28 simultaneously being cut off. The two electronic valves have a common anode conduit, running to the amplifier part 36.

The particular arrangement of the amplifier 36 is of no importance to this invention. In the example shown the amplifier contains a first modulator tube 37, made as a hexode valve. The inner control grid is fed with the voltage from the electronic tube 28 or 29, over a condenser 38, whereas the outer control grid of tube 37 is fed with alternating current from a seperate triode tube 125 which is connected to an inductance 126 and capacitance 127 to form an oscillator circuit. One may of course instead use a triode-hexode tube or any other convenient modulator arrangement, which causes an intermediate frequency oscillation in the circuit 39. The circuit 39 is connected to the primary winding of an intermediate frequency transformer 46, the secondary winding of which is branched off in two different directions. Here first the branch conduit to the intermediate frequency amplifier 40 shall be described.

The amplifier 40 contains a triode tube 41, which is connected through the condenser 42 to an intermediate frequency voltage from the secondary winding of the transformer 46. The output voltage from the electronic tube 41 is further amplified over an intermediate frequency transformer 43 and thereafter fed to a rectifier device, which will be further described below, said rectifier device containing a rectifier tube 44 and a resistor tube 45.

The other branch conduit from the secondary winding of the intermediate frequency transformer 46 goes to a diode tube 47, working on a load resistor 48. This is short-circuited for alternating current by means of a condenser 49. Across the resistor 48 therefore a voltage for automatic amplification control is formed, said voltage being fed to the voltage conductor 50 over a diode tube 51 connected in series. The diode tube 51 has for its purpose to serve as a uni-directional conductor for determining if an amplification control voltage shall be present on the conductor 50 or not. For this purpose the cathode of the diode tube is connected to a negative voltage 53 through a resistor 52, whereas the conductor 50 is connected through two blocking resistors 54 and 55 to a second negative voltage 56. The voltage 53 is substantially more strongly negative than the voltage 56. For instance the voltage 53 may be minus 60 volts, whereas the voltage 56 will be only minus 2 volts. A resistor tube of triode type 57 is, however, also interconnected from the cathode conductor of the diode tube 51 to a strongly positive voltage.

This arrangement functions in the following way: Assuming first that no radio frequency signal is impressed upon the intermediate frequency transformer 46, there will also be obtained no voltage drop across the load resistor 48 of the rectifier tube 47. Consequently, no current will run through the triode tube 57, viz. from the positive source of voltage through the electronic tube 57 and the resistor 52 to the negative terminal 53. The internal resistance in the electronic tube 57 is thereby small relative to the resistance 52, and the cathode conductor common to the electronic tubes 57 and 51 will then be positive potential as compared with the anode of the diode tube 51. This diode tube will therefore be blocked, and no current will run through the resistors 54 and 55.

If however a strong signal should enter the intermediate frequency transformer 46, a voltage drop will be obtained over the load resistor 48, and the voltage on the grid of the triode tube 57 will be displaced in negative direction, so that the internal resistance of this electronic tube will be successively increased. Simultaneously the voltage on the common cathode conductor is displaced in negative direction, because the resistor 52 will be small as compared with the interior resistor of the electronic tube 57. The diode tube 51 will therefore be conductive, and the voltage in the conductor for automatic amplification control will be object of normal variation. In the conductor 50 there are, as mentioned above, interconnected blocking resistors 54 and 55, which are, however, small as compared with the magnitude of the resistor 52 as well as the magnitude of the internal resistance of the electronic tube 57. Further, there is a blocking condenser 58 as well as further blocking resistors 59 and 60 in the conductors to the electronic tubes, which are subject to automatic amplification control. Thus the resistor 59 is present in the conductor to provide automatic amplification control of the tube 37, and the resistor 60 in the conductor to provide automatic amplification control of the tube 41.

For the above given reasons it is found to be desirable to cut out the automatic amplification control, when the electronic tube 28 is active, that is when the signal from the directional antenna system is received. For this purpose the control voltage from the apparatus 35 is also connected to a transformer 61, the secondary winding of which is in series with a rectifier 62 connected across the resistor 54. During the time when the electronic tube 28 is functioning, that means when the control voltage has one given half-wave direction, there is created by means of the rectifier 62 a voltage drop across the resistor 54. This voltage drop acts in such a direction as to place a strongly negative voltage on the anode of the diode tube 51, and this diode tube is blocked, so that the arrangement for automatic amplification control is put out of function. On the other side, no such current will be pressed on the resistor 54 from the transformer 61, when the electronic tube 29 is active during the other, counter-directed half-period of the control voltage, and consequently the arrangement for automatic amplification control will then be functioning.

The rectifier 44, which was connected to the secondary coil of the intermediate frequency transformer 43, has for its purpose to impress the necessary voltage on the magnetic deviation apparatus for the cathode ray tube 21 for causing deviation of the cathode ray. For this purpose, the coil system 23—24 is kept in rotation synchronously with the rotation of the antenna system 10, in the above mentioned way. The stronger the signal is, which is received by the antenna system 10 and amplified through the radio frequency amplifier tube 28, the modulator tube 37 and the intermediate frequency amplifier tube 41, the higher will the working voltage of directional nature be, emanating across the load resistor 63 of the diode rectifier tube 44. However, in the conduit from the load resistor 63 to the coil system 23—24 a resistor tube 45 is interconnected. This resistor tube is of triode type, and the control grid is connected to one terminal of the load resistor 63, whereas the cathode of the tube 45 is connected with one coil in the deviation system of the cathode ray tube 21, and the other terminal of the resistor 63 is connected with the other coil. When the coils 23 and 24 are kept rotating, they are for this purpose provided with contact rings 64 and 65, respectively, with which the contact brush 66 and 67, respectively, cooperate. The anode in the triode tube 45 is connected to ground 69 over the secondary winding of a transformer 68. The primary winding of the transformer 68 is fed from the control voltage apparatus 35. The winding direction is such that a negative voltage will be impressed upon the anode of the tube 45 during the time, when the electronic tube 29 is functioning, but a positive voltage will be impressed upon said anode during the time, when the electronic tube 28 is functioning. Thus it is assured that no control action will be created on the cathode ray tube 21, when the signal from the antenna system 10 is blocked by a sufficiently strong negative bias voltage on the control grid of the electronic tube 28.

It is therefore seen that during half of the voltage period of the control voltage from the apparatus 35, the electronic tube 28 will be functioning. During this time the signal from the antenna system 10 is transferred over the contact rings 25 and the condenser 30 to the electronic tube 28, where this signal is amplified, said signal thereafter being impressed upon the control grid of the modulator tube 37 over the condenser 38. From the output circuit of the electronic tube 37 the amplified signal carried on the intermediate frequency will be impressed upon the transformer 46, from which it is transferred to the electronic tube 41 over the condenser 42. The output circuit of the electronic tube 41 is finally connected to the rectifier tube 44 over the intermediate frequency transformer 43, said tube creating across its load resistor 63 a control voltage for the cathode ray tube. This control voltage is transferred by means of the triode tube 45, which is during this half period obtaining positive anode voltage from the transformer 68, and it is fed to the deviation means of the cathode ray tube 21, so that a visible picture of the antenna characteristic is obtained. It is thereby supposed, that the frequency of the alternating voltage of the apparatus 35 is low, as compared with the frequency of the input signal. On the other hand, the alternating voltage from the apparatus 35 should preferably be of such frequency that a great number of cycles occur during one turn of the rotation of the antenna system 10. Theoretically, in such a case the picture indicated on the screen of the cathod ray tube 21 would consist only in a series of points, corresponding to the half-cycles of the alternating voltage from the apparatus 35, during which the antenna 10 is connected to the arrangement, the antenna 12 simultaneously being de-connected. Due to the diffusion on the screen of the cathode ray tube, a continuous curve will, however, be visible there, if the alternating voltage from the apparatus 35 has a frequency, which is sufficient high as compared with the speed of rotation of the shaft 14.

It is, however, also obvious that during the succeeding half-cycle of the control voltage from the apparatus 35, when the eletcronic tube 29 is functioning, and the electronic tube 28 is blocked, the signal from the non-directional antenna system 12 will be introduced on the grid of the electronic tube 29 over the coupling condenser 31, and will be fed from this electronic tube to the modulator tube 37 and the intermediate frequency transformer 46. Even if in this case the electronic tubes 41 and 44 are in function, they do not however, control the cathode ray tube 21, because the amplifier tube 45 for the directed voltage across the load resistor 63 is blocked, the anode voltage being negative. On the other hand, a voltage will be created across the resistor 48 of the rectifier tube 47, said resistor being short-circuited for alternating current by means of the condenser 49, so that only a slowly fluctuating control voltage for automatic amplification control will be obtained. Because of the action of the blocking tube 51, this control voltage will only be active during the time when the electronic tube 29 is functioning, that is when the signal from the non-directional antenna system 12 is received. Due to the load equalizing action of the condenser 58, the control voltage will, however, remain with substantially sustained magnitude during all of the time, independent of the fact that no load current is fed to the condenser 58 during the half-period, when the signal from the antenna 10 is received, but only during the half-period of the control voltage, when the signal from the antenna 12 is amplified.

Directed antenna systems of the kind, which may be used for the antenna system 10, cannot, however, be kept in rotation with deliberately high speeds. For purely mechanical reasons there is, as a matter of fact, a speed limitation, for instance caused by the strains which would emanate due to the centrifugal force. The number of direction findings during a given time will then be dependent of the number of turns, with which the antenna system 10 is rotated during the same time. It is possible for the direction finding frequency to be so low that no good reading is possible. For instance, the curve visible on the screen of the cathode ray tube 21 may be subject to a flutter action. It is then advisable to provide for a plurality of different antenna systems, rotating in mutually displaced angles, so that first one, then the other antenna system causes the direction finding and so on. With such a system it is necessary to use an auxiliary coupling arrangement so that the cathode ray tube is not simultaneously influenced by the input signal from more than one directional antenna.

Figure 2:
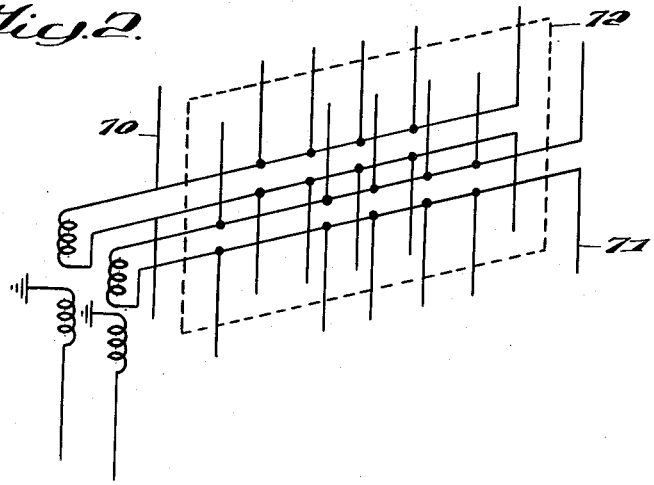
Fig. 2 shows a schematic picture of a preferred antenna system, composed by two directional antennas.
Figure 3:
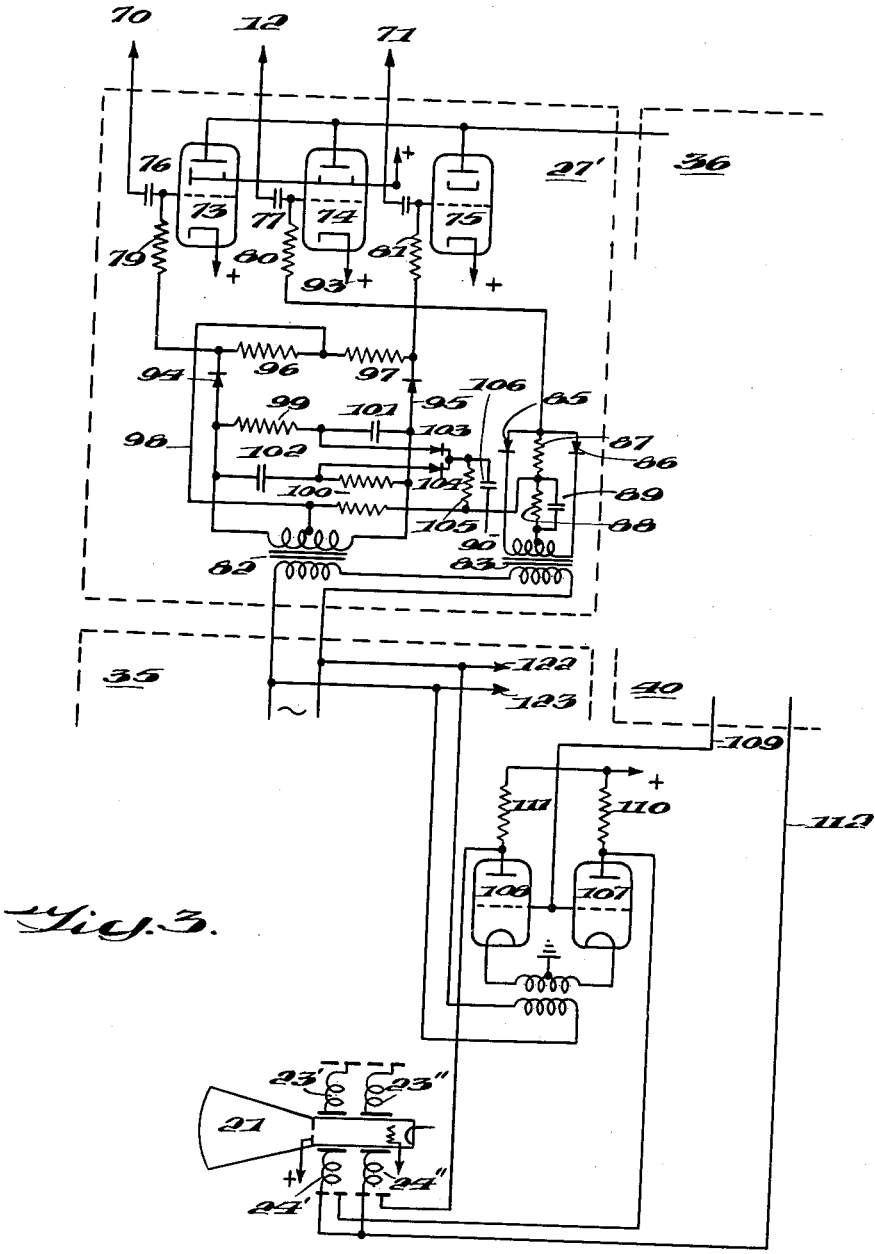
Fig. 3 shows a modification of a given part of the antenna system according to Fig. 1 and intended to be used in connection with the antenna system according to Fig. 2.

Fig. 2 shows an antenna system, comprising two antenna units, which is usable for this purpose. Fig. 3 shows the modification, required in some of the details contained in the arrangement according to Fig. 1, in order that this arrangement shall be usable in connection with an antenna system according to Fig. 2.

The antenna system according to Fig. 2 contains two antenna units 70 and 71, respectively, as well as a grounded screen 72 provided between them, each of said antennas 70 and 71, respectively, being of the type which has been called "broad-side-antenna." Such antenna units are known per se.

If one wishes, for instance, to receive a frequency range between 100 and 150 mc./s., the horizontal extension of one antenna system according to Fig. 2 will be about 6 meters. Regarding normal strength relations one may then allow a rotational speed of one turn per 4 seconds, that is a direction finding indication will be obtained every second second. If further the active mass on the screen of the cathode ray tube 21 is made sufficiently slow acting, one will obtain a continuous picture of the direction indication, which is not erased during the intervals of time free from direction finding.

In the arrangement according to Fig. 3, an apparatus is thus shown, which should be introduced instead of the changing arrangement 27 according to Fig. 1, in order to adapt the arrangement to the antenna system, as shown in Fig. 2. The antennas 70 and 71 are thereby connected to the conductors, which in Fig. 3 are indicated by the same figures, and the non-directional antenna system 12 is also connected to the conductor 12 of Fig. 3. The three conductors 70, 12 and 71 run to the grid circuit of three electronic tubes 73, 74 and 75, to which the antenna conductors are connected across coupling condensers 76, 77 and 78. The three grids are further provided with coupling resistors 79, 80 and 81. The anode conduit of the three tubes 73, 74 and 75 is common and runs to an amplifier 36, which may be identical with the amplifier shown in Fig. 1.

Further, when connecting the arrangement according to Fig. 3 to the arrangement according to Fig. 1, the transformer 61 should be removed, and the terminals 120 and 121 should be connected to the conductors 122 and 123.

Instead of the transformer 33 in the arrangement according to Fig. 1, two transformers 82 and 83 are used in the arrangement according to Fig. 3. The transformer 83 thereby intends in the first place to provide a bias voltage for the electronic tube 74, the grid circuit of which is connected to the non-directional antenna system 12, whereas the transformer 82 intends to provide grid bias voltage for the electronic tubes 73 and 75, the grid circuits of which are connected to the directed antenna systems 70 and 71, repectively.

Figure 4:
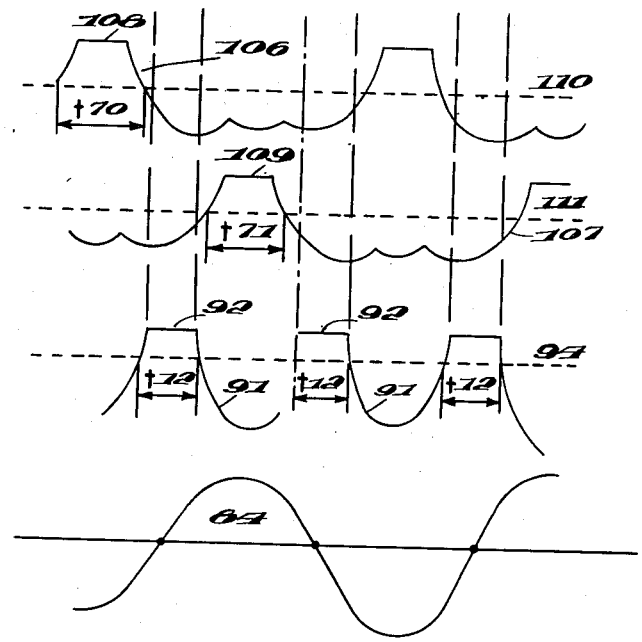
Fig. 4 shows curves intended for explaining the function of the modified system according to Fig. 3.

For explanation of the emanation of the present grid voltages, reference is further made to Fig. 4. This figure shows in the lower part a curve 84, representing the sine wave control voltage obtained from the device 35. This control voltage is transformed in the transformer 83 and is thereafter made object of double-wave rectification in the usual way by means of two rectifiers 85 and 86, respectively, working on a common load resistor divided in two parts 87 and 88, respectively. The load resistor 88 is short-circuited by means of a condenser 89, and the connection point between the resistors 87 and 88 is connected to a source of weakly negative voltage 90. This bias voltage may for instance be in the order of magnitude of −2 volts.

By double-wave rectification one would obtain a series of half-periods of voltage, all of which directed in the same direction, so that when turning from one half-period to another, a discontinuity would be obtained, which would, in the diagram according to Fig. 4, appear as a peak directed upwards on the curve 91. Due to the negative bias voltage in the point 90, this peak is, however, cut off, as indicated in Fig. 4 by 92. The curve 91—92 in Fig. 4 will therefore indicate the bias voltage, fed to the electronic tube 74, and controlling the function of this electronic tube. The cathode circuit of the tube 74, is, however, connected to a suitable, weakly positive voltage 93, adapted in such a way that the electronic tube is cut off, when the total voltage difference between the cathode and the grid is negative relative to the line 94, indicated by dotted lines in Fig. 4. The electronic tube, with other words, will only function within the interval of time, indicated in Fig. 4 by means of $t_{12}$. It should be observed, that two such intervals of time will occur during each full period of the control voltage from the device 35.

The secondary winding of the transformer 82 is also provided for double-wave rectification over two rectifiers 94 and 95 and two load resistors 96 and 97. The connection point between the resistors 96 and 97 is connected by means of the conductor 98 with the mid-point of the secondary winding of the transformer 82.

This arrangement causes a grid bias voltage on the electronic tubes 73 and 75 in the form of a series of rectified half-waves. On this grid bias, however, a sine voltage is superimposed, which is in one case displaced in phase by 90° in negative direction, and in the other case displaced in phase by 90° in positive direction. The two sine voltages are obtained by the connection of secondary winding of the transformer 82 to a phase displacement filter, consisting in the resistors 99 and 100 and the condensers 101 and 102. The connection point between the resistor 99 and the condenser 101 is connected to the rectifier 103, and the connection point between the resistor 100 and the condenser 102 is connected to the rectifier 104. The two rectifiers are coupled in parallel on their sides directed away from the resistors and the condensers, respectively, and are connected to the negative voltage 90 over a decoupling resistor 105 and the short-circuit condenser 106 belonging thereto.

Also the voltages created across the phase displacement filters are made object of double-wave rectification, so that the voltages displaced in phase created thereby will occur, one across the resistor 96 and the other one across the resistor 97. The resulting bias voltage of the electronic tube 73 will therefore have the form indicated by the curve 106, whereas the resulting bias voltage for the electronic tube 75 will obtain the form indicated by the curve 107. The peaks of both of these curves as well as of the curve 91 are cut off, as indicated by 108 and 109, respectively. Further the cathodes of the electronic tubes are connected to a positive bias voltage, whereby a cut-off level 110 and 111, respectively, is obtained, comparable with the cut-off level 94 of the electronic tube 74.

It is now easily seen from Fig. 4, that the function of the arrangement will be the following:

During a first period of time, indicated $t_{70}$, the electronic tube 73 will be functioning, so that the input signal from the antenna 70 will be amplified and fed to the common anode circuit, this signal thereby being reproduced on the screen of the cathode ray tube 21, as already described in connection with Fig. 1. After the ending of the interval of time $t_{70}$, the non-directional auxiliary antenna will in turn during the interval of time $t_{12}$ function by means of the electronic tube 74, so that consequently automatic amplification control is obtained. After the ending of this function, the antenna 71 will in turn function during an interval of time indicated $t_{71}$. After the ending of this interval of time, automatic amplification control will again take place during an interval of time $t_{12}$. In this way, a cyclical operation will take place in the following sequence, viz. antenna 70, antenna 12, antenna 71, antenna 12, antenna 70, antenna 12, antenna 71, antenna 12 and so on. The result of this will, however, be that two different cigar-shaped direction finding pictures are obtained on the screen of the cathode ray tube 21, the common central lines of which indicating the direction to be found. This direction will, however, not be unambiguous, but under given conditions a difficulty may arise in deciding: if one or the other one of the two cigar-formed figures is indicating the real direction to be found. In other words, this means, that if one is not watchful on the ambiguity of the indication of direction, one may obtain a direction indication error of 180°.

But even this matter may be obviated by a further form of development of the invention, which is also evident from Fig. 3. According to this form of development of the invention, the cathode ray tube is provided with two different sets of deviation coils, 23′ and 24′ as well as 23″ and 24″, respectively. The coils indicated by a prime are then subordinated the electronic tube 73, whereas the coils provided with a second are subordinated the electronic tube 75. The first-mentioned pair of coils is thus fed with a voltage, obtained from the antenna 70, whereas the latter pair of coils is fed with a voltage, obtained from the antenna 71.

For alternatively blocking the pairs of coils 23' and 24' as well as 23" and 24", respectively, two electronic tubes 107 and 108, respectively, are provided as pure direct current amplifier tubes, to amplify the output voltage from the device 40. The control grids are thus connected to the conduit 109, see Fig. 1, whereas the electronic tubes working across anode resistors 110 and 111, respectively, are with their anodes connected to the coil systems in question. The other terminals of said coil systems are connected by conductor 112 to the device 40, see Fig. 1.

In the cathode circuit of the two electronic tubes 107 and 108, a transformer is connected, provided with a grounded mid-point tap, the primary winding of said transformer being connected to the control voltage from the device 35. During one half-period, viz. the negative half-period of the control voltage 84 according to Fig. 4, the electronic tube 107 will thus have a negative cathode bias voltage, so that this electronic tube is active, whereas the electronic tube 108 has a positive cathode bias voltage, so that this tube is cut off. During this half-period of the control voltage, the input voltage from the antenna 70 according to the curve 106, see Fig. 4, will therefore be fed to the pair of coils 23', 24', for forming the cigar-formed direction finding characteristic on the screen of the cathode ray tube. During the half-period thereafter following, the tube 107 will be provided with positive cathode bias, so that this tube is cut off. Simultaneously, however, the electronic tube 108 will get negative cathode bias voltage, and this will therefore repeat the signal, which is during the positive half-period of the control voltage 84, see Fig. 4, derived from the antenna 71. The coil systems 23' and 24' as well as 23" and 24", respectively, are assumed in this case to be wound in opposite directions, so that the two cigar-formed figures, which should be obtained on the screen of the cathode ray tube 21, are now supposed to coincide and unambiguously indicate the direction to be found.

Of course, the invention is not limited to the above described arrangements which form forms of execution, but different modifications may be made within the frame of the invention.

What is claimed is:

1. An arrangement for automatic volume control in receivers for radio direction finding comprising, a directional antenna system containing at least one directional antenna for obtaining the signal intended for direction finding; a non-directional antenna system by which the signal intended for automatic volume control is obtained, a cathode ray tube, an amplifier for feeding signals from said antenna sysems to said cathode ray tube; at least one first electronic tube for transferring signals from said directional antenna system to said amplifier; a second electronic tube for transferring signals from said non-directional antenna to said amplifier, a source of alternating current, and means connecting said source to said first and second tubes to permit said tubes to transfer signals only during alternate half cycles of said source.

2. An arrangement according to claim 1, in which the two electronic tubes are provided with a common anode conductor, means connecting said conductor to said amplifier to alternatively amplify the signal voltage from one tube and then the other one, said means for connecting said tubes to alternating current comprising, a transformer, the secondary winding of said transformer being interconnected in the grid-cathode circuits of the electronic tubes with one half of its winding in the grid-cathode circuit of the one electronic tube and with the other half of the winding in the grid-cathode circuit of the other electronic tube, the primary winding of the transformer being connected to said alternating current source.

3. An arrangement according to claim 2, and means including a control conductor connecting the source of alternating current to said amplifier in such a way that the amplifier is made inactive when said first tube is active.

4. An arrangement according to claim 3, in which said last named means comprises, a blocking circuit provided in the transfer path from said anode conductor, giving bias voltage for automatic volume control, a transformer connected to said source of alternating current and feeding said blocking circuit in such a way that no control voltage is fed to the control conductor during the half period of the alternating current when the signal from the directional antenna system shall be transferred to the means for reading the direction.

5. An arrangement according to claim 4, further comprising that a diode rectifier tube with load resistor connected to said control conductor for creating the control voltage is connected to said amplifier to be fed with voltage from an amplifier tube in the amplifier, said blocking circuit comprising, a second rectifier tube being interconnected in the conductor between the load resistor and the control conductor for blocking the feed of voltage to the control conductor during one half period, the cathode of said second rectifier tube being connected to a voltage which is normally negative in relation to the voltage fed to the anode of the rectifier tube, the conductor between the rectifier tube and the normally negative voltage point containing a resistor, a triode connected in series with said resistor, the anode of said triode being connected to positive voltage, the grid of said triode being connected to the load resistor in such a way that the cathode of the second rectifier tube is biased positive relative to the anode when no load voltage is present on the load resistor.

6. An arrangement according to claim 1, further comprising a common anode conductor connecting said electronic tubes to said amplifier, a second amplifier for amplifying and rectifying the signal from the directional antenna system, means connecting the output circuit of the first mentioned amplifier to said second amplifier, means connecting said second amplifier to the source of alternating current in such a way that the signal from the directional antenna system is transferred to said cathode ray tube on alternate half cycles of the alternating current from the source of alternating current.

7. An arrangement according to claim 6, further including a connection from said second amplifier to said cathode ray tube, a direct current conducting electronic tube connected into said last-named connection between the second amplifier and the cathode ray tube, the anode circuit of said direct current conducting electronic tube being connected by means of a transformer to the source for alternating current with such direction of voltage that the direct current conductive tube will be conductive only during the half cycle of the voltage from the source of alternating current when indication shall take place.

8. An arrangement according to claim 7, further comprising an electronic tube in said second amplifier, said electronic tube being coupled to a rectifier tube with load resistor, the load resistor being connected in series with the cathode ray tube and the direct current conductive tube.

9. An arrangement according to claim 1, in which the cathode ray tube is provided with magnetic control windings, provided to rotate synchronously with the directed antenna system.

10. An arrangement according to claim 9, and motor driven shaft means for driving the directional antenna system in circular rotation, and means connecting said magnetic control windings to said shaft means for synchronous rotation.

11. An arrangement according to claim 10, in which the frequency of the alternating current emanating from the source of alternating current is high in relation to the rotational speed of the directional antenna system but low as compared with the frequency of the input signal to the directional antenna system.

12. An arrangement according to claim 1, in which the directional antenna system contains at least two antenna units, mutually mechanically displaced and in which two said electronic tubes are connected to said units, and a common anode conductor for said electronic tubes running to the amplifier.

13. An arrangement according to claim 12, in which said means for connecting said tubes to a source of alternating current includes means for connecting both said first electronic tubes to said alternating current so that each first electronic tube is only active during the time when the direction characteristic of each directional antenna of the directional antenna system is turned in the direction to be found.

14. An arrangement according to claim 13, in which said last named means includes two transformers connected to said source of alternating current, one of said transformers being arranged to create bias voltage for said first electronic tubes, which amplify the oscillation from the directional antenna, whereas the other one of the transformers is provided to create bias voltage for said second electronic tube which is provided to amplify the signal from the non-directional system.

15. An arrangement according to claim 14, and a phase displacement filter provided in the secondary circuit of said transformer for said first electronic tubes, said filter having at least two circuits arranged for creating bias voltage for the electronic tubes of the signal from the directional antenna, said phase displacement filter being of such a kind that the electronic tubes obtain a bias voltage allowing for amplification only during the periods of time when direction finding is taking place.

16. An arrangement according to claim 15, in which the circuits contained in the phase displacement filter are connected each to one rectifier, and so coupled that only one of the circuits contained in the phase displacement filter is active, when one antenna should be active, and only the other one of the circuits contained in the phase displacement filter is active, when only the other one of the antenna should be active.

17. An arrangement according to claim 16, said cathode ray tube being provided with two separate control means, two blocking tubes having their anode circuits connected to each of said control means, the grid-cathode circuit of said blocking tubes containing the secondary winding of a transformer, the primary winding of which is connected to the source of alternating current in such a way that one blocking tube is blocking the feed of the signal indicating voltage to one control means, whereas the other blocking tube is allowing the control voltage to be fed to the other control means and vice versa.

References Cited in the file of this patent

UNITED STATES PATENTS

| | | |
|---|---|---|
| 1,916,358 | Bruce et al. | July 4, 1933 |
| 2,061,737 | Offenhauser | Nov. 24, 1936 |
| 2,327,641 | Hooven | Aug. 24, 1943 |